United States Patent [19]

Agrawal

[11] Patent Number: 4,507,745
[45] Date of Patent: Mar. 26, 1985

[54] DATA PROCESSING APPARATUS HAVING ALTERABLE INTEREST RATE MODE CAPABILITY

[75] Inventor: Mahendra P. Agrawal, Lubbock, Tex.

[73] Assignee: Texas Instruments Incorporated, Dallas, Tex.

[21] Appl. No.: 332,437

[22] Filed: Dec. 21, 1981

[51] Int. Cl.³ .............................................. G06F 3/02
[52] U.S. Cl. ..................................... 364/709; 364/408
[58] Field of Search ............... 364/408, 705, 709, 715, 364/200, 900

[56] References Cited

U.S. PATENT DOCUMENTS

| | | | |
|---|---|---|---|
| 3,955,074 | 5/1976 | Rode et al. | 364/709 |
| 3,976,975 | 8/1976 | Cochran | 364/900 |
| 4,055,757 | 10/1977 | Tillman et al. | 364/715 |
| 4,194,242 | 3/1980 | Robbins | 364/200 |

Primary Examiner—Gareth D. Shaw
Assistant Examiner—Tim A. Wiens
Attorney, Agent, or Firm—Robert D. Marshall, Jr.; N. Rhys Merrett; Melvin Sharp

[57] ABSTRACT

A data processing apparatus having preprogrammed functions for calculating interest rate dependent variables employs an interest rate mode designation command to enable operation in a selected one of a set of interest rate modes. In the preferred embodiment actuation of an AEC key advances the interest rate mode in a circularly sequential manner among annual percentage rate (sometimes referred to an annual nominal interest rate), annual effective interest rate and annual continuous interest rate. In the preferred embodiment actuation of a key sequence including a compute key and the AEC key enables conversion of an interest rate specified in a first mode into an interest rate specified in the next sequential mode. The data processing apparatus includes a means for outputting an indication of the current interest rate mode.

6 Claims, 7 Drawing Figures

DATA PROCESSING APPARATUS HAVING ALTERABLE INTEREST RATE MODE CAPABILITY

BACKGROUND OF THE INVENTION

The present invention relates to data processing apparatuses which include preprogrammed functions enabling the user to compute various interest rate dependent functions. This function capability is most often found in the so called "business" calculators. These calculators generally include a wide variety of functions in addition to the four basic arithmetic operational functions of addition, subtraction, multiplication and division. These machines typically include various keystroke sequences which enable the operator to enter the independent variables in one or more interest rate dependent functions and to designate the dependent variable to be calculated.

A problem exists with the typical calculator of this type. Most often calculators of this type have been functionally programmed to operate in only a single interest rate mode. In the United States interest rates for interest rate dependent calculations are typically specified as an annual percentage rate (APR). The annual percentage rate is also known as annual nominal interest rate. The annual percentage rate is computed by multiplying the interest per compounding period by the number of compounding periods per year. However, in other contexts the interest rate may be specified in other modes. One of these other modes is annual effective interest rate (EFF) which is computed based upon compound interest and is therefore dependent upon the number of compounding periods per year. A third type of interest rate sometimes employed is annual continuous interest rate (CONT). An annual continuous interest rate is based upon the concept of continuous compounding and forms the limit of annual effective interest rate as the number of compounding periods per year becomes very large. Previous business calculator design has heretofore not permitted calculation of interest rate dependent formulas in more than one interest rate mode. Thus, the operator is required to recall and correctly execute key strokes for calculating the interest rate dependent functions in the differing modes and for calculating the interest rate mode conversions, rather than relying upon the preprogrammed functions of the machine. Such a requirement places a greater burden on the operator to correctly recall the function to be performed, and to correctly depress the key sequence required to perform this function. This requires greater operator attention and leads to an enhanced probability of operator errors in the performance of the required calculation. In addition, even assuming that the operator correctly remembers and correctly enters the proper sequence, this operation requires greater time than the operation of a preprogrammed function which typically requires depression of only one or two keys of the keyboard.

SUMMARY OF THE INVENTION

It is an object of the present invention to provide a data processing apparatus which enables calculation of interest rate dependent function in differing interest rate modes. This invention is most applicable to business calculators which are preprogrammed to enable calculation of interest rate dependent functions.

In a preferred embodiment of the present invention a business calculator is employed which provides a plurality of preprogrammed interest rate dependent functions. These preprogrammed interest rate dependent functions are enabled by operational commands entered into the calculator via an operator input means such as a keyboard. Also included within this keyboard is some means for designating the interest rate specification mode. In the preferred embodiment this designation takes the form of a single operator input key which changes the interest rate specification mode to the next mode in a circularly sequential set of permitted interest rate specification modes.

The preferred embodiment of the present invention also includes a visual display. This visual display generates an indication of the digits of a calculated answer and further generates a visual indication of the current interest rate specification mode.

BRIEF DESCRIPTION OF THE DRAWINGS

The above and other objects and further aspects of the present invention will become clear from the following description taken in conjunction with the drawings, in which:

FIG. 12 illustrates a block diagram of the circuitry employed in a data processing apparatus in accordance with a preferred embodiment of the present invention;

DETAILED DESCRIPTION OF THE PREFERRED EMBODIMENT

Figure 1:
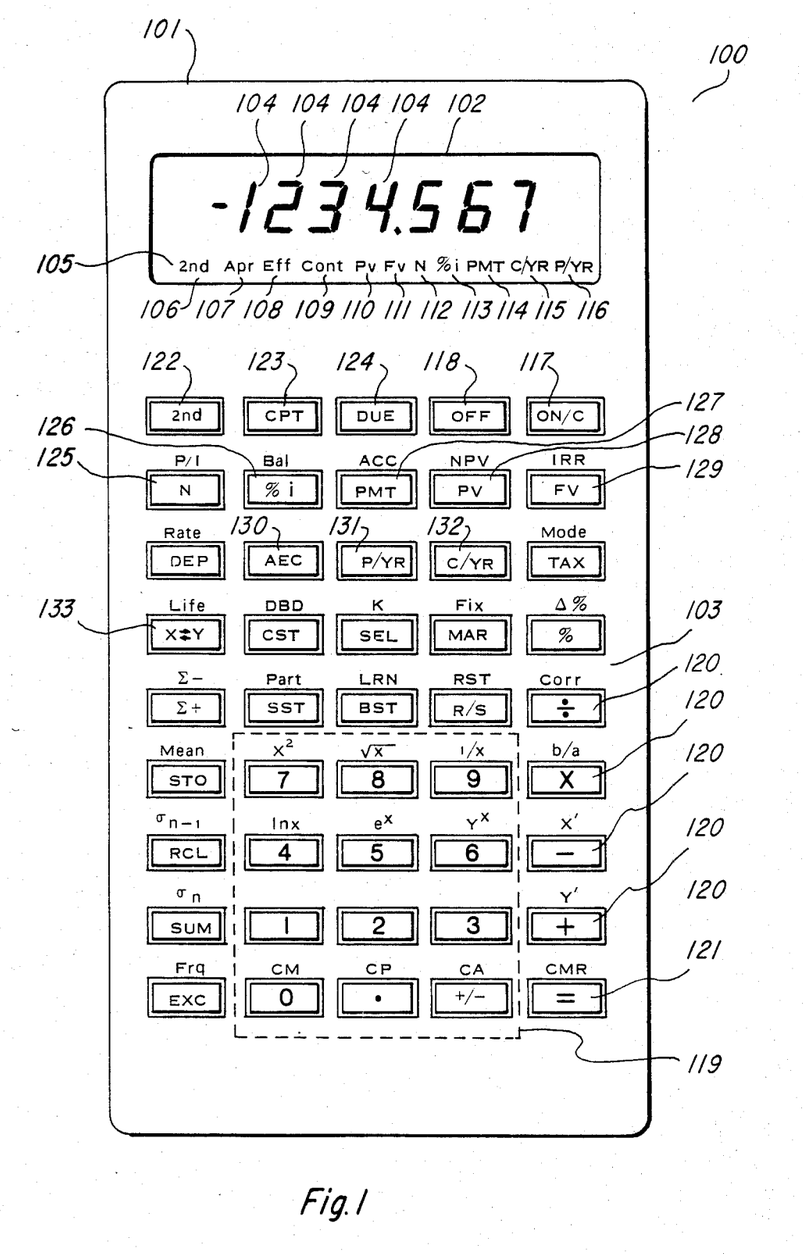
FIG. 1 illustrates the front panel of a data processing apparatus in accordance with a preferred embodiment of the present invention.

FIG. 1 illustrates the front panel of the case of a data processing apparatus which is the subject of the present application. As illustrated, this data processing apparatus is conventionally known as a business calculator. The name business calculator applies generally to hand-held or desk top machines which perform mathematical operations from inputs from a keyboard and which supply a visual display which is the output of the results. These mathematical operations in a business calculator include preprogrammed mathematical operations such as calculation of present value, future value, payments, number of payments and interest rate each of which are dependent upon a specified interest rate.

FIG. 1 shows the front panel of data processing apparatus 100 which illustrates substantially all of the machine/user interface components. Data processing apparatus 100 includes case 101, display 102 and keyboard 103.

Display 102 includes a plurality of digits 104, which are preferrably of the seven segment type and which include the provision of a decimal point between digits. However, it is known in the art to construct a display such as display 102 as a set of dot matrix elements which may enable display of alphabetic as well as numeric characters. Digits 104 are primarily employed to provide a visual output of the numerical results of the machine. In addition, a data processing apparatus of this type typically also generates an output indication of input data as it is input. Display 102 also generates an output indication of the operational state of the machine. Display 102 preferrably include a plurality of state indicator 105 which indicate the internal state of the machine.

The group of state indicators 105 includes individual indicators 106 to 116. Indicator 106 provides an indication when second key 122 has been depressed thereby enabling the secondary functions of additional keys of keyboard 103 in a manner that will be more fully described below.. One and only one of indicators 107, 108 and 109 is actuated at any particular time to indicate the interest rate mode of the machine. One of the indicators 110, 111, 113, and 114 is actuated to provide an indication of the designation of input data and to provide an indication of the particular interest rate dependent function whose calculator result is displayed by digits 104. One of indicators 115 or 116 is actuated to designate entry of the number of compounding periods per year or the number of payment periods per year, respectively. Data processing apparatus 100 optionally includes further state indicators for error conditions or to announce additional machine states.

In the preferred embodiment each of the seven segments and the decimal point of digits 104 and each of the state indicators 105 are formed of separately actuable liquid crystal display devices. It is well understood in the art that display 102 can be formed of other means such as separately actuable light emitting diodes or vacuum flourescent display devices. In addition a visual output may also be made by a printer, either in conjunction with or instead of the above mentioned display devices.

User input of data and operational commands to the data processing apparatus 100 is made by a keyboard 103. Keyboard 103 is preferrably made up of a plurality of momentary contact key switches, each of these key switches having one or more predefined functions. On/-clear key 117 is employed to turn the data processing apparatus on if the apparatus is turned off. If the apparatus is turned on, on/clear key 117 functions to clear the number display by display 102 in order to enable input of new numerical data or in order to enable input of corrected numerical data in the case that the operator has made a mistake in entry. Off key 118 is employed to turn data processing apparatus 100 off.

Keyboard 103 includes a plurality of numeric input keys 119. These numeric input keys 119 include the decimal digits 0 to 9, a decimal point and a sign control key. Together these twelve keys are employed to enter numeric data into the machine to provide the required operands for mathematical functions to be performed.

Keyboard 103 further includes a plurality of operational/functional command keys. These operational/-functional command keys enable the user to input to the machine commands for performing the desired operations and functions. These opertional/functional command keys include four function keys 120 forming the basic four arithmetic operations of addition, subtraction, multiplication and division. These operational/-functional command keys also include an equal sign key 121 which enables the completion of an entered algebraic expression, thereby commanding the machine to compute the desired result from the entered data and the entered commands. Typically, data processing apparatus 100 includes a plurality of other operational/-functional command keys such as illustrated for performing a variety of other types of calculations.

The operational/functional command keys may include a plurality of data processing control operational command keys. These keys are employed to change the meaning of depression of particular keys to command operations differing from the primary operations. These data processing control command keys include second key 122, compute key 123 (CPT) and due key 124 (DUE). The second key 122 is employed to designate a secondary function for at least some of the other keys of keyboard 103. As illustrated in FIG. 1, a significant number of the keys of keyboard 103 have a primary function indicated on the key and a secondary function indicated on the display panel above the key. The second key 122 is employed to designate the secondary function for the next depressed key. Compute key 123 and due key 124 are employed in conjunction with N key 125, % i key 126, PMT key 127, PV key 128 and FV key 129 in order to initiate a preprogrammed operational function for calculation of certain interest rate dependent variables. The operation of the data processing apparatus in conjunction with these keys will be further described below.

In addition to the keys described above keyboard 103 of data processing apparatus 100 ilustrates AEC key 130, P/YR key 131 and C/YR key 132. AEC key 130 is employed in a manner which will be more fully illustrated below to designate the interest rate specification mode of operation of the data processing apparatus. P/YR key 131 is employed to enter the number of payment periods per year. Similarly, C/YR key 132 is employed to designate the number of compounding periods per year. Both P/YR key 131 and C/YR key 132 are employed to enter independent variables in the preprogrammed functions built into data processing apparatus 100.

Figures 2, 3:
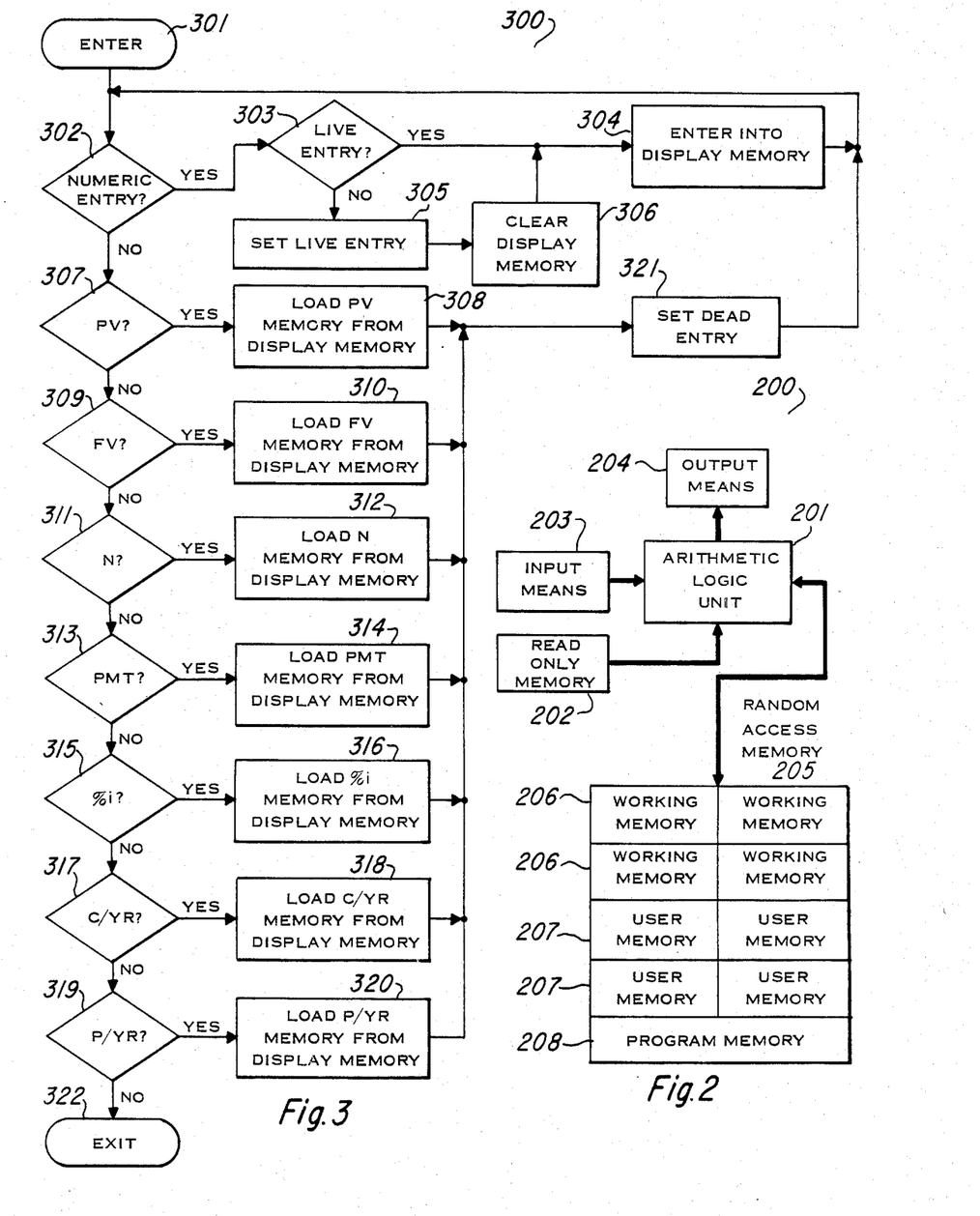
FIG. 3 illustrates a flow chart of the data entry operation of a data processing apparatus constructed in accordance with a preferred embodiment of the present invention.

FIG. 2 illustrates a block diagram of data processing apparatus 200 which may be used to embody the present invention. Central to the functioning of data processing apparatus 200 is arithmetic logic unit 201. Arithmetic logic unit 201 performs all of the computational and control functions necessary for the operation of data processing apparatus 200. The operation of arithmetic logic unit 201 is controlled by a read only memory 202 in conjunction with data and command inputs from input means 203. Input means 203 is typically embodied by keyboard 103 illustrated in FIG. 1. Read only memory 202 preferably includes a plurality of instruction words which are sequentially applied to arithmetic logic unit 201 thereby causing it to perform desired operations. These desired operations typically include so called "overhead" functions. These overhead functions would typically include periodically checking the condition of input means 203 to determine whether an input signal is generated, decoding any received input signal to determine the next operation to be performed, generation of signals for output via output means 204. Output means 204 is typically embodied by display 102 illustrated in FIG. 1. The instruction words stored in read only memory 202 are generally in machine code, that is each instruction word commands arithmetic logic unit 201 to perform a single simple operation. Groups of instruction words are read out of read only memory 202 in accordance with particular inputs received from input means 203 to cause arithmetic logic unit 201 to perform each of the functions of the keys illustrated in FIG. 1. In performing these commanded functions arithmetic logic unit 201 sends data to random access memory 205 for storage therein and retrieves data previously stored in random access memory 205 for operation thereon. In accordance with the groups of instruction words stored in read only memory 202 arithmetic logic unit 201 addresses various portions of random access memory 205. Thus random access memory 205 is partitioned into several types of memory units in accordance with the instructions of read only memory 202.

Random access memory 205 includes a plurality of working memories 206 which are employed to store the pending operands applied to arithmetic logic unit 201, an indication of entered but unperformed commands and various calculated intermediate values. Working memories 206 may also be used as address pointers to store the address of particular instruction words in read only memory 202. This would typically include the storage of the address of a return point in read only memory 202 during the execution of a subroutine. Typically one of the working memories 206 is employed to store the data which is output via output means 204. This is accomplished by read only memory 202 commanding arithmetic logic unit 201 to read out the data stored in this particular working memory and to apply appropriate signals to output means 204 to cause output means 204 to generate an indication of this data.

In the data processing apparatus 200 of the present invention random access memory 205 also includes at least one user memory 207. As will be further explained below in conjunction with the description of the operation of the present invention, various user memories 207 are employed to store independent variables required for calculation of a plurality of interest rate dependent functions which are preprogrammed within the data processing apparatus.

Random access memory 205 may also include a program memory 208. Program memory 208 is employed for storing a set of a plurality of input commands from input means 203. This set of input commands is stored in program memory 208 by the user by selection of appropriate input commands from input means 203 in order to enable the data processing apparatus to perform a user selected series of commands. Typically the program steps stored in program memory 208 each correspond to one of the operational/functional keys of keyboard 103 which generate the input signals from input means 203. Thus each of these program steps in program memory 208 accesses a group of instruction words in read only memory 202 for applying the desired instructions to arithmetic logic unit 201 in order to perform the selected functions.

By adopting this form of construction, data processing apparatus 200 becomes in effect a miniature programmed digital computer. By proper selection of the instruction words permanently stored in read only memory 202 during the manufacture of data processing apparatus 200, the manufacturer may provide a selected group of preprogrammed functions which are enabled by proper inputs from input means 203. Because a typical data processing apparatus 200 has arithmetic logic 201, read only memory 202 and random access memory 205 embodied in a single integrated circuit chip, the instruction words stored in read only memory 202 maybe changed by changing a single manufacturing step in the integrated circuit construction. Thus an entirely new data processing apparatus 200 may be constructed which performs an entirely new set of functions without the necessity for completely redesigning the generalized computer like structure of the apparatus.

The operation of the data processing apparatus of the present invention will now be described in conjunction with the flow charts illustrated in FIGS. 3, 4 and 5. It is understood that these flow charts illustrate the general steps in the operation of data processing apparatus 200 and are not intended to illustrate the exact program stored in read only memory 202. It should be understood that one skilled in the art of design of such data processing apparatuses would be able to provide the proper exact program to be stored in read only memory 202 to perform the functions illustrated in the flow charts of FIGS. 3, 4, and 5 once selection is made of the particular arithmetic logic unit 201 to be employed with its particular instruction set.

FIG. 3 illustrates a flow chart of the data entry operation of a data processing apparatus constructed in accordance with the teachings of the present invention. It should be understood that the operations illustrated in FIG. 3 represent only a portion of the operations performed by the data processing apparatus, specifically only those portions relevant to the description of the present invention. Other operations which are performed by the data processing apparatus which embodies this invention are conventional and are not further described herein.

Program 300 is entered via entry point 301. As described above, program 300 illustrates a subset of the operations performed by the data processing apparatus and may be entered as a subroutine at entry point 301. Program 300 first tests to determine whether a received entry from keyboard 103 is a numeric entry from keys 119 (decision block 302). If the received input is a numeric entry from keys 119, then program 300 tests to determine whether the apparatus is in live entry mode (decision block 303). If the apparatus is in the live entry mode then the entered data from numeric entry keys 119 is entered into the display memory (processing block 304). As described above, one of the working memories 206 of random access memory 205 is employed to store the data to be displayed via display 102. This working memory 206 will hereinafter be referred to as the display memory. Entry into the display memory follows a fixed format. If one of the decimal digits 0 to 9 has been entered via depression of one of the keys 119, then the data within the display memory is shifted one digit to the left and the new digit is entered into the least significant digit position. If the entry is a decimal point then the decimal point is entered to the right of the last entered digit. If the numeric entry is a plus/minus entry then the sign of the number stored in the display memory is changed to the opposite sign. After entering this data into the display memory program 300 returns to the beginning of this subroutine.

In the case in which the data processing apparatus is not in live entry mode the program 300 branches from decision block 303 to processing block 305. At this time the apparatus is set into the live entry mode (processing block 305) and the contents of the display memory is cleared (processing block 306). Thereafter the received numeric entry is entered into the display memory in the same manner as described above (processing block 304).

In the event that a received entry is not a numeric entry, program 300 tests to determine whether the entry is from PV key 128 (decision block 307). This key is employed to specify that the data within the display memory is to be regarded a present value entry. If PV key 128 has been depressed then the data stored within the display memory is entered into one of the user memories 207 designated the PV memory (processing block 308). As an optional feature, indicator 110 is actuated to indicate that the number displayed has been designated as a present value (PV).

In the event that PV key 128 has not been depressed, program 300 checks to determine whether FV key 129 has been depressed (decision block 309). FV key 129 is employed to designate an entry as a future value. If FV key 129 has been depresed then the data stored within the display memory is loaded into one of the user memories 207 designated the FV memory (processing block 310). As an optional feature, indicator 111 is actuated to indicate that the number displayed has been designated a future value (FV).

In a manner similar to that described above in regard to the present value and future value, program 310 next sequentially tests whether N key 125, PMT key 127, % i key 126, C/YR key 132 and P/YR key 131 have been actuated. The N key 125 is used to designate the number of payments. If this key is depressed the data stored in the display memory is stored in one of user memories 207 designated the N memory (processing block 312). The PMT key 127 is used to designate the dollar amount of payment. If this key is depressed the data in the display memory is loaded into a PMT memory (processing block 314). The % i key 126 is used to designate the interest rate. If this key is depressed the data in the display memory is loaded into a % i memory (processing block 316). The C/YR key 132 is used to designate the number of compounding periods per year. If this key is depressed the data within the display memory is loaded into a C/YR memory (processing block 318). Lastly, the P/YR key 131 is used to designate the number of payment periods per year. If this key is actuated the data in the display memory is loaded into a P/YR memory (processing block 320). If noen of these keys have been depressed then program 300 is exited (termination block 322). As an optional feature, a corresponding indicator is actuated upon the actuation of one of these keys to indicate the designation of the number displayed.

As can be readily appreciated from a study of program 300 illustrated in FIG. 3, the keys 125 to 129 are employed to designate particular independent variables used in calculation of interest rate dependent functions. This entry format requires the operator to enter the data via numeric entry keys 119. This data is then displayed via display 102 as it is entered. By depression of one keys 125 to 129 the operator then designates the data stored within the display memory as one of the independent variables and causes this data to be stored into a memory associated with that independent variable. This data is then employed in a manner more fully described below in conjunction with calculation of the interest rate dependent functions. After each of these designation and storage operations has been completed, program 300 then sets the apparatus into dead entry mode (processing block 321) and returns to the start of this subroutine. The apparatus is thus ready for entry of additional numeric data for designation as another independent variable.

Figure 4:
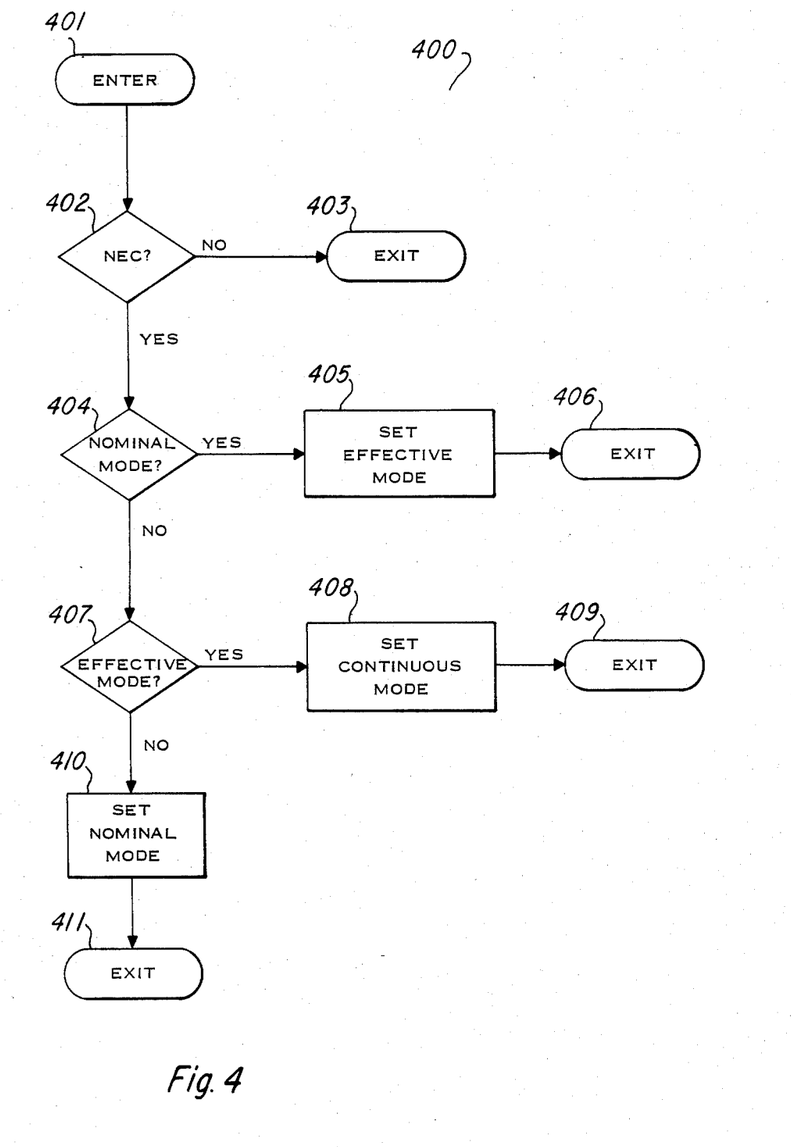
FIG. 4 illustrates a flow chart of the interest rate mode specification operation of a data processing apparatus constructed in accordance with a preferred embodiment of the present invention.

Program 400 illustrated in FIG. 4 comprises the preferred embodiment of the manner in which the interest rate specification mode is designated in the present invention. Program 400 as illustrated is a subroutine of the processes performed by the data processing apparatus. As in the case of program 300, program 400 illustrates an outline of the operations of the machine and not the exact detail of operation. Program 400 is entered via entry point 401. Program 400 first tests to determine whether AEC key 130 has been actuated (decision block 402). If AEC key 130 has not been actuated, then program 400 is executed via termination point 403.

If the AEC key 130 has been depressed then program 400 tests to determine whether the data processing apparatus is in the annual nominal interest rate mode (decision block 404). If the data processing apparatus is in the annual percentage rate mode then program 400 causes the data processing apparatus to enter the annual effective interest rate mode (processing block 405). As a consequence of entry into the annual effective interest rate mode indicator 108 of display 102 is actuated. This indicator segment 108 indicates "EFF" which is understood to mean that the apparatus has been set into the annual effective interest rate mode. Program 400 is then exited via termination point 406.

In the event that the data processing apparatus is not within the annual percentage rate mode, then program 400 tests to determine whether the data processing apparatus is in the annual effective interest mode (decision block 407). In the event that the data processing apparatus is in the annual effective interest rate mode, then program 400 causes the data processing apparatus to enter the annual continuous interest rate mode (processing block 408). As a consequence of entry into the annual continuous interest rate mode, indicator 109 of display 102 is actuated. Actuation of indicator 109 causes a "CONT" display which indicates to the operator that the apparatus is set in the annual continuous interest rate mode. Program 400 is then exited via termination point 409.

In the event that the data processing apparatus is not in the annual effective interest rate mode, then the data processing apparatus must be in the annual continuous interest rate mode. In this event program 400 causes the data processing apparatus to enter the annual nominal interest rate mode (processing block 410). As a consequence of entry into the annual nominal interest rate mode indicator 107 of display 102 is actuated. Actuation of indicator 107 causes an "APR" indication which informs the operator that the data processing apparatus is in the annual percentage rate mode. Next program 400 is exited via termination point 411.

As can readily appreciated from a study of program 400 illustrated in FIG. 4, a circularly sequential set of interest rate specification modes has been defined. Depression of AEC key 130 advances the interest mode to the next sequential interest rate specification mode within the circularly sequential set of three interest rate specification modes. It should be understood that this particular form of designation of the interest rate specification mode has been selected as a matter of convenient design choice and that other methods of designation of the interest rate mode are possible. For example, it is possible to have key on keyboard 103 for designation of each possible interest rate specification mode. Thus upon depression of a particular one of these keys, the data processing apparatus would be caused to enter the corresponding interest rate mode. However, the interest rate specification mode designation technique of program 400 is preferred because this technique requires only a single key of keyboard 103, thereby preserving additional keys for other functions.

Figure 5A:
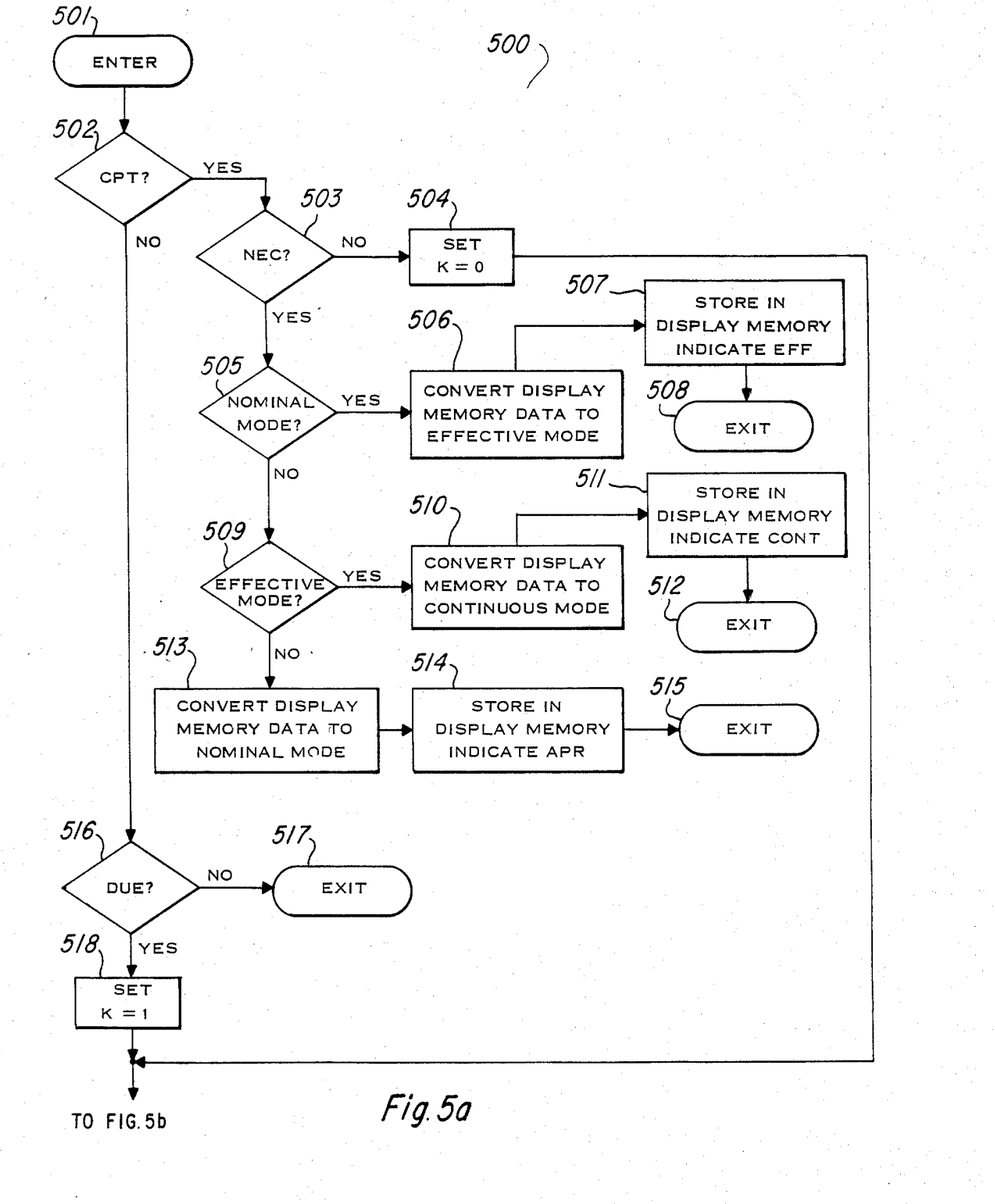
FIGS. 5a-5c illustrate a flow chart of the computational operation of a data processing apparatus constructed in accordance with a preferred embodiment of the present invention.
Figure 5B:
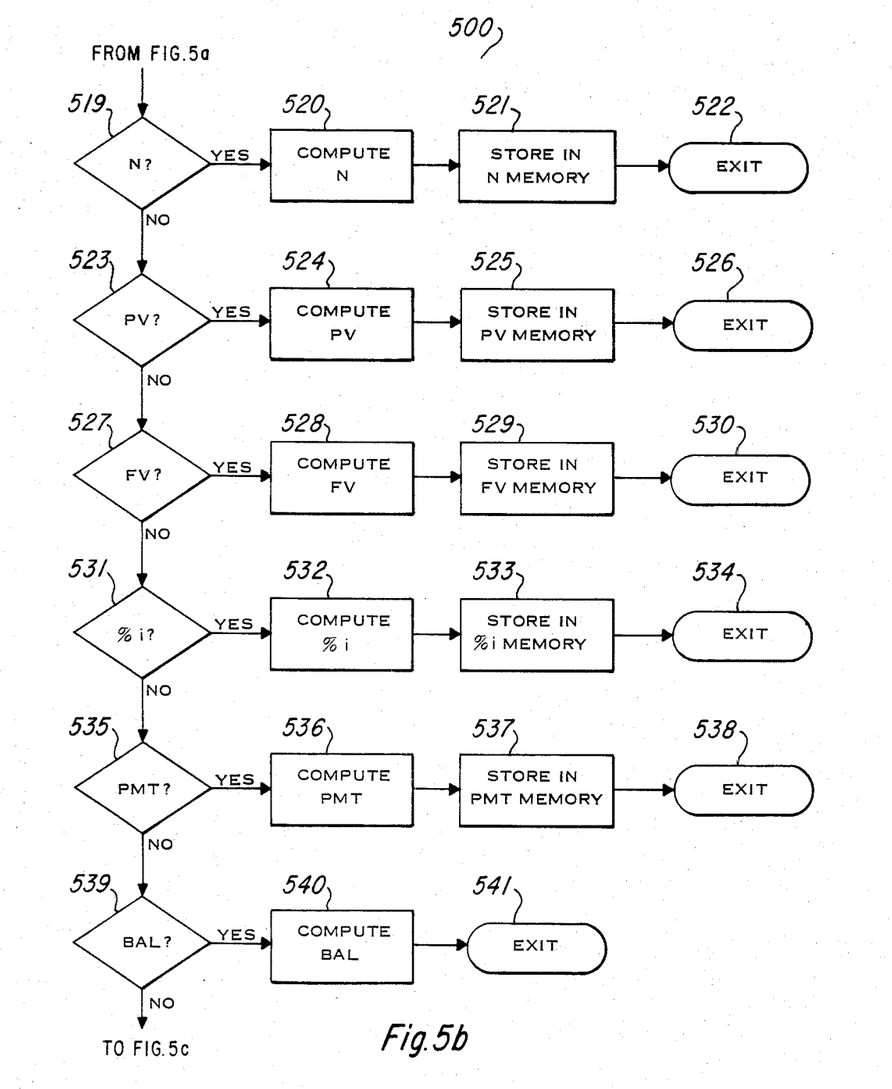
Figure 5C:
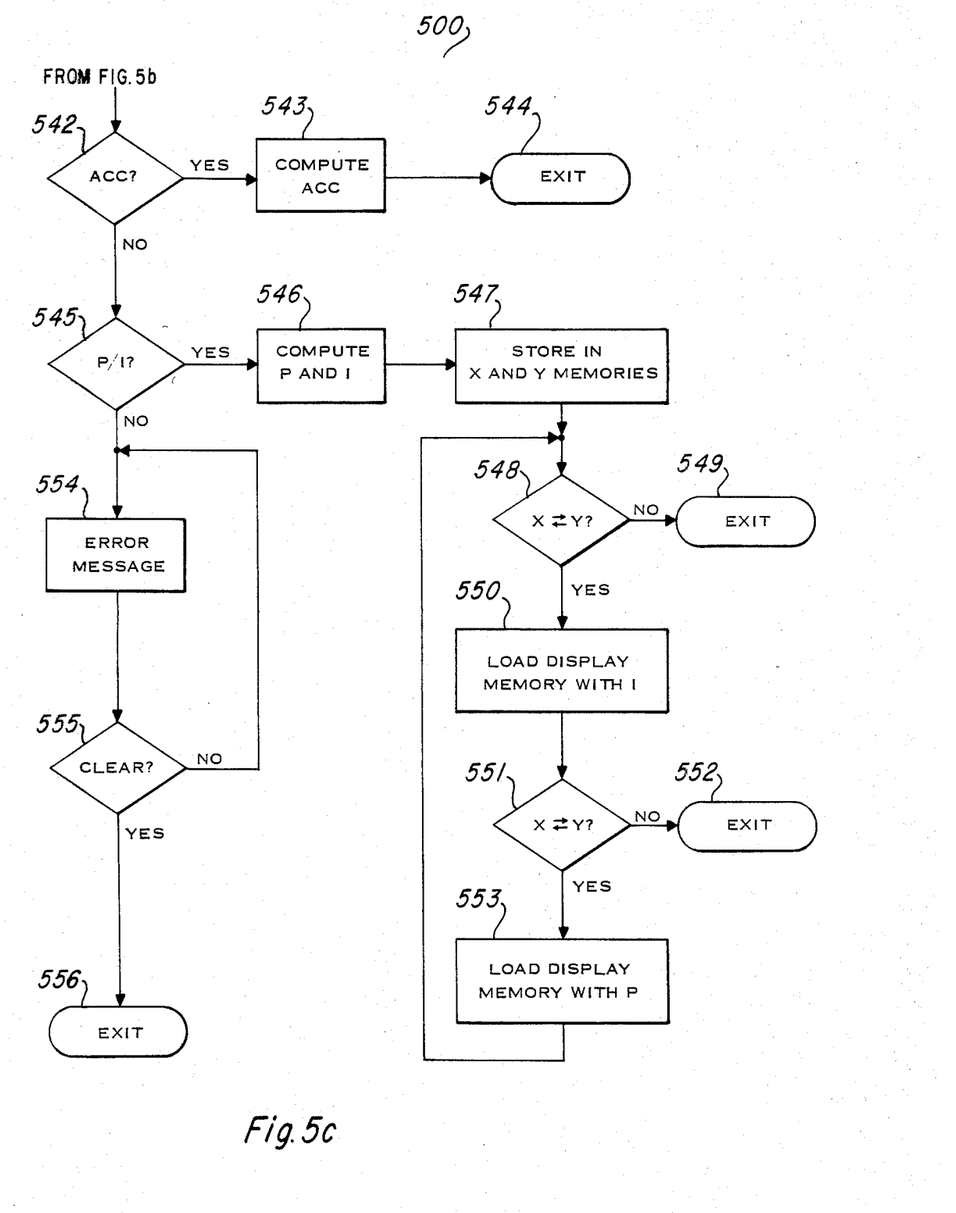

FIGS. 5A, 5B and 5C illustrate program 500. Program 500 illustrates a preferrable manner in which a data processing apparatus operates in accordance with the present invention. As in the previous FIGS. 3 and 4, FIGS. 5A, 5B and 5C illustrate only the general outline of machine operation and numerous design choices are necessary to generate the exact program to be stored in ROM 202.

Program 500 is entered via entry point 501. The program first tests to determine whether the CPT key 123 has been actuated (decision block 502). Actuation of CPT key 124 indicates the entry of a compute command. If such a compute command has been received, program 500 test to determine whether AEC key 130 has been actuated (decision block 503). If AEC key 130 has not been actuated then program 500 sets a parameter K equal to zero (processing block 504) and the program advances to decision block 519 appearing in FIG. 5B. The significance of this action will be more fully explained below in conjunction with a description of the computation of various interest rate dependent variables.

In the event that a key stroke sequence including actuation of CPT key 123 followed by AEC key 130 is received, program 300 tests to determine whether the data processing apparatus is in the annual nominal interest rate mode (decision block 505). If this is so then the data within the display memory is assumed to be an interest rate specified in the annual nominal interest rate mode and the data processing apparatus converts this data into an equivalent interest rate in the annual effective interest rate mode (processing block 506). This is calculated in accordance with the following formula:

$$EFF = ((1 + APR/(100 \times C/YR))^{C/YR} - 1) \times 100 \quad (1)$$

in which, EFF is the equivalent annual effective interest rate as a percent to be calculated, APR is the annual percentage rate as a percentage stored in the display memory, and C/YR is the number of compounding periods per year stored in the C/YR memory. It is understood that one skilled in the art of data processing apparatuses of the type described would be able to provide the proper program for storage within read only memory 202 to perform this calculation. Once the conversion takes place to according to equation (1) the result is stored in the display memory (processing block 507). At the same time state indicator 107 is deactivated and state indicator 108 is activated to indicte the new interest mode. Program 508 is then exited via termination block 508.

In the event that the data processing apparatus is not in the annual percentage rate mode, program 500 tests to determine whether the data processing apparatus is in the annual effective interest rate mode (decision block 509). If this is the case then the data within the display memory is assumed to be annual effective interest rate and this interest rate is converted into the annual continuous rate mode (processing block 510). This conversion takes place according to the following formula:

$$CONT = (\ln(1+EFF/100) \times 100 \quad (2)$$

wherein, CONT is the equivalent annual continuous interest as a percentage rate and EFF is the data within the display memory assumed to be the annual effective interest rate as a percentage. Next the result from equation (2) is stored in the display memory so that it can be shown to the operator (processing block 511). At the same time state indicator 108 is deactivated and state indicator 109 is activated to indicate the apparatus is in the "CONT" mode. Then program 500 is exited (termination block 512.).

In the event that the data processing apparatus is not in the annual effective interest rate mode, then the data processing apparatus must be in the annual continuous interest rate mode. In this case program 500 assumes the data in the display memory to be an interest rate expressed in the annual continuous interest rate mode and converts this interest rate into an interest rate expressed in the annual nominal interest rate mode (processing block 513). This conversion takes place in accordance with the formula:

$$APR = (C/YR)(e^{CONT/(100 \times C/YR)} - 1) \times 100 \quad (3)$$

wherein, APR is the annual percentage rate as a percentage to be calculated, CONT is the data within the display memory assumed to be an annual continuous interest rate and C/YR is the number of compounding periods per year stored in the C/YR memory. Once this conversion takes place the result is stored in the display memory and the state indicators are altered to display "APR" (processing block 514). Then program 500 is exited via termination block 515.

It should be understood that the same interest rate conversion just described could also be initiated by activation of DUE key 124. In such a case processing block 504 would follow directly from a yes determination of decision block 502 and decision block 503 would be placed in a position within program 500 equivalent to decision blocks 519, 523, 527, 531, 535, 539, 542 and 545.

In the event that CPT key 123 has not been actuated, program 500 tests to determine whether DUE key 124 has been actuated. If DUE key 124 has been not been actuated then program 500 is exited via termination block 517. However, if DUE key 124 has been actuated then program 500 sets the parameter K to be zero (processing block 518). As will be more fully explained below, this parameter K is used to distinguish between an ordinary annuity case in which the computation is enabled by actuation of CPT key 123 and K is set equal to zero and an annuity due case in which the computation is enabled by actuation of DUE key 124 and in which the parameter K is set equal to one.

If either CPT key 123 or DUE key 124 is actuated then the data processing apparatus tests to determine whether N key 125 is actuated (processing block 519 appearing in FIG. 5B). If N key 125 has been actuated then program 500 computes the number of payments in accordance with the following formula:

$$N = \frac{\ln\left(\frac{FV - PMT(1 + iXK)/i}{PV - PMT(1 + iXK)/i}\right)}{\ln(1 + i)} \quad (4)$$

in which, N equals the number of payments to be calculated, FV equals the future value, PMT equals the dollar amount of payment, i equals the interest rate per compounding period in a compound interest case or the interest rate per payment period in an annuity case expressed as a decimal, K is the annunity parameter set in the manner set forth above and PV is the present value. The factors FV, PMT and PV are retrieved from their respective memories into which these parameters have been stored in accordance with program 300 illustrated in FIG. 3. The value of i is calculated depending upon the particular interest rate mode and depending upon whether a compound interest problem or an annuity problem is specified. If a compound interest rate problem is specified then i is specified by $i_c$ and is calculated in accordance with the following formulas:

$$i_c = \frac{APR}{100 \times C/YR} \quad (5)$$

$$i_c = (1 + EFF/100)^{1/(C/YR)} - 1 \quad (6)$$

$$i_c = e^{CONT/100} - 1 \quad (7)$$

according to the particular interest rate mode specified and therefore the interest rate mode of the data stored in the % i memory. In the case of an annuity problem the i appearing in equation 4 is $i_p$ and is calculated in accordance with the following formulas:

$$i_p = (1 + APR/(100 \times C/YR))^{(C/YR)/(P/YR)} - 1 \quad (8)$$

$$i_p = (1 + EFF/100)^{1/(P/YR)} - 1 \quad (9)$$

$$i_p = e^{CONT/(P/YR)} - 1 \quad (10)$$

the proper formula being selected in accordance with the interest rate mode of the machine. Note that as in the equations above APR, EFF and CONT are expressed as percentages. Upon selection of the proper type of problem and the interest rate mode, the proper equation from among the set of equations (5) to (10) is made and an i is calculated for substitution in equation (4) in order to enable calculation of the value of N. This computed value of N is stored within the display memory to provide the result of the calculation to the user. Indicator 112 is actuated to indicate that a calculated value of the number of payments (N) is displayed. Program 500 then stores this computed value of N in the N memory (processing block 521) and program 500 is exited (termination block 522).

In the event that N key 125 has not been actuated then program 500 tests to determine whether PV key 128 has been actuated. If PV key has been actuated then program 500 calculates the present value (processing block 524) in accordance with the following formula:

$$PV = FV(1+i)^{-N} + PMT(1+i \times K)(1-(1+i)^{-N})/i \quad (11)$$

in which the independent variables are derived in a manner fully set forth above. Note that equation (11) is one of a number of possible alternative equations known in the art for calculation of present value. This particular equation was selected as a matter of convenient design choice. Once this present value is calculated it is stored in the display memory to provide a indication of the results to the operator. In addition, indicator segment 110 is actuated. Indicator segment 110 provides a visual display of "PV" which is understood by the operator to indicate that a present value is being displayed. After this computation of the present value this data is stored in the PV memory (processing block 525) and program 500 is exited (termination block 526).

In the case that PV key 128 has not been actuated then program 500 tests to determine whether FV key 129 has been actuated (decision block 527). If this key has been actuated when it indicates that the operator desires calculation of the future value. This future value is calculated (processing block 528) in accordance with the following formula:

$$FV = PV(1+i)^N - PMT(1+i \times K)((1+i)^N - 1)/i \quad (12)$$

in which the variables are derived in a manner fully set forth above. As in the case of the calculation of present value according to equation (11), equation (12) is a convenient design choice from among a number of alternative equations for calculation of future value. Once this future value is calculated it is stored in the display memory in order to enable a visual display of the results to the operator. At the same time this result is stored in the display memory indicator segment 111 is actuated. Indicator segment 111 provides a "V" indication to the operator, informing the operator that a future value is being displayed. After the future value has been computed program 15 stores this future value in the FV memory (processing block 529) and program 500 is exited (termination block 530).

If FV key 129 has not been actuated then program 500 tests to determine whether % i key 126 has been actuated (decision block 531). If this key has been actuated then the data processing apparatus is enabled to compute % i in accordance with the following formula:

$$i_c = (FV/PV)^{1/N} - 1 \quad (13)$$

for a compound interest problem and $i_p$ is calculated according to an iteration technique in an annuity case. This iteration is most conveniently done by making successive approximations of $i_p$ until the left and right hand sides of equation (11) are sufficiently close to provide an adequate measure of $i_p$. This process is well known in the art and need not be further described here. The calculated interest rate $i_c$ or $i_p$ is then converted into the interest rate specification mode designated by the state of the data processing apparatus in accordance with the following formulas:

$$APR = i_c \times (C/YR) \times 100 \quad (14)$$

$$EFF = ((1+i_c)^{(C/YR)} - 1) \times 100 \quad (15)$$

$$CONT = 100 \times \ln(1 + i_c) \quad (16)$$

$$APR = ((1 + i_p)^{\frac{P/YR}{C/YR}} - 1) \times (C/YR) \times 100 \quad (17)$$

$$EFF = ((1+i_p)^{P/YR} - 1) \times 100 \quad (18)$$

$$CONT = (P/YR \times \ln(1+i_p)) \times 100 \quad (19)$$

Once this percent interest rate is calculated it is stored in the display memory and indicator segment 113 is actuated to indicate that a interest rate percentage is displayed. Thereafter, program 500 stores the calculator results in the % i memory (processing block 533) and program 530 is exited (termination block 534).

In the event that % i key 126 has not been actuated then program 500 tests to determine whether PMT key 127 has been actuated (decision block 535). If PMT key 127 has been actuated, then the data processing apparatus computes the dollar amount of payment in accordance with the following formula:

$$PMT = \frac{PV(1 + i)^N - FV}{(+ iXK)((1 + i)^N - 1)} \quad (20)$$

wherein the independent variables are specified in a manner fully set forth above. As in the case of equations (11) and (12), equation (20) is a convenient design choice from among several alternatives. Once this payment amount has been calculated it is stored within the display memory and indicator segment 114 is actuated. Next program 500 stores this calculated payment amount in PMT memory (processing block 537) and program 500 is exited (terminal block 538).

In the event that PMT key 127 has not been actuated then program 500 tests to determine whether a BAL command has been received. The BAL command is generated by sequential actuation of second key 122 and % i key 126. This sequence specifies that the secondary function of % i key 126 is to be performed. As illustrated in FIG. 1, the secondary function of % i key 126 is generation of the BAL command. The principle balance remaining after M payments is calculated in accordance with the following formula:

$$BAL(M) = \frac{PV(1 + i_p)^M}{(1 + i_pXK)} - PMT((1 + i_p)^M - 1)/i_p \quad (21)$$

wherein M is the payment number which has previously been entered into the display memory and the other variables are drived in a manner fully set forth above. This calculator result is then stored in the display memory. Note that no separate user memory 207 has been designated for the storage of a computed principle balance and therefore this quantity is not stored in random access memory 205. After the computation of this quantity program 500 is exited via termination block 541.

If a BAL command has not been received then program 500 tests to determine whether a ACC command has been received. In a manner similar to the generation of a BAL command, the ACC command is generated by a sequence including actuation of second key 122 followed by actuation of PMT key 127. If such an operational command has been received then the accrued interest after M payments is calculated according to the following formula:

$$ACC(M) = M \times PMT + BAL(M) - PV \quad (22)$$

in which M is the number stored within the display memory and BAL(M) is the quantity calculated in accordance with equation 21. This calculated result is stored within the display memory for communication to the operator. Program 500 is then exited via termination block 544.

In the event that an ACC command has not been received, program 500 tests to determine whether a P/I command has been received (decision block 545). A P/I command is generated by the sequence of actuation of second key 122 followed by actuation of N key 125. If this command has been received then the principle part of the Mth payment (P) and the interest part of the Mth payment (I) are calculated according to the following formula:

$$P(M) = PMT - I(M) \quad (23)$$

$$I(M) = i_p \times BAL(M-1) \quad (24)$$

where BAL(M−1) is the result of equation 21 if M−1 is substituted for M. Note that BAL(0)=0 for an annuity due calculation, that is when due key 123 is used to activate the computation and set K=1, and BAL(0)=PV for the ordinary annuity case when compute key 123 activates the computation and sets K=0. In addition as specified above M is the number currently entered into the display memory. Once these two quantities are computed they are stored within two of the working memories 206 designated as X and Y (processing block 547). In the preferred embodiment the working memory X is the same as the display memory and therefore upon receipt of the P/I command the data processing apparatus computes both P and I and displays P. Program 500 next determines whether the XY exchange key 133 has been actuated (decision block 548). If this key has not been actuated then program 500 is exited via termination block 549. If this exchange key has been actuated then the data within the memories X and Y is exchanged and therefore the display memory is loaded with the computed result I (processing block 550) and this computed number I is communicated to the opertor. Program 500 next determines whether the XY exchange key 133 has been actuated (decision block 551). If this key is not actuated then program 500 is exited (termination block 552). If the XY exchange key 133 has been actuated then program 500 again exchanges the data within memories X and Y thereby loading the display memory with the calculated value P (processing block 553). Program 500 next returns to decision block 548. In this manner the two computed results can be sequencially reviewed by the operator by repeated actuation of XY exchange key 133.

If a P/I command has not been received, then program 500 generates an error message (processing block 554) because all valid inputs following a compute or due input have been eliminated leaving only invalid sequences. Program 500 remains in this error state until a clear input is received via on/clear key 117 (decision block 555). Once a clear input is received program 500 is exited (termination block 556).

What is claimed is:

1. A data processing apparatus comprising:
an operator input means for entering numerical data and operational commands, said operational commands including (a) at least one interest rate dependent operational command corresponding to an interest rate dependent data processing function and (b) at least one interest rate mode designation command for designating one of a plurality of interest rate specification modes, said operator input means further includes means for designating one of a circularly sequential ordered set composed of said plurality of interest rate specification modes and means for designating the next sequential one of said ordered set of said interest rate specification modes upon entry of said interest rate mode designation command;
an arithmetic means, responsive to said input means, for performing entered operational commands on entered data and generating a result, including performing interest rate dependent operational commands on entered data in the designated interest rate specification mode; and
an output means for generating an operator perceivable indication of said result generated by said arithmetic means.

2. A data processing apparatus as claimed in claim 1, wherein:
said sequentially ordered set of interest rate specification modes is composed of annual percentage interest rate, annual effective interest rate and annual continuous interest rate.

3. A data processing apparatus as claimed in claim 1, wherein:
said output means further includes means for generating an operator perceivable indication of said designated interest rate specification mode.

4. A data processing apparatus as claimed in claim 3, wherein:
said output means includes visual display means having a plurality of digits for providing an visual indication of said result and having an interest rate mode indicator for providing a visual indication of said designated interest rate specification mode.

5. A data processing apparatus as claimed in claim 1, wherein:
said operator input means includes a keyboard having a plurality of operator actuable keys including an interest rate specification mode key.

6. A data processing apparatus as claimed in claim 1, wherein:
said operational commands further include a plurality of independent variable designation commands, each for designating entered numeric data as a corresponding independent variable in said interest rate dependent data processing functions, said independent variables including the number of compounding periods per year and the number of payment periods per year, and
said output means further comprises means for generating an operator perceivable indication of the type of independent variable upon entry of the corresponding independent variable designation command.

* * * * *